United States Patent [19]

Lipsky

[11] 4,257,047

[45] Mar. 17, 1981

[54] METHOD AND APPARATUS FOR ELECTRICALLY SCANNING AN ANTENNA ARRAY IN A MONOPULSE DF RADAR SYSTEM

[75] Inventor: Stephen E. Lipsky, Kings Point, N.Y.

[73] Assignee: General Instrument Corporation, Clifton, N.J.

[21] Appl. No.: 35,599

[22] Filed: May 3, 1979

[51] Int. Cl.³ .......................... G01S 5/04; G01S 5/02; G01S 13/00
[52] U.S. Cl. ................................. 343/120; 343/16 M; 343/114.5; 343/118
[58] Field of Search ................ 343/113 R, 114, 114.5, 343/115, 118, 119, 120, 16 M

[56] References Cited

U.S. PATENT DOCUMENTS

| 3,056,961 | 10/1962 | Michell | 343/117 A |
| 3,824,596 | 7/1974 | Guion et al. | 343/119 |
| 3,906,505 | 9/1975 | Lipsky | 343/119 |
| 3,939,477 | 2/1976 | Green et al. | 343/119 |
| 4,062,015 | 12/1977 | Litva et al. | 343/120 |

*Primary Examiner*—Stephen C. Buczinski

*Attorney, Agent, or Firm*—James & Franklin

[57] ABSTRACT

From an antenna array of a plurality of fixed, narrow beamwidth antennas, geographically oriented to provide omnidirectional coverage, a set of antennas is selected. The selected set includes first and second oppositely oriented pairs of adjacent antennas. The signals received by the adjacent antennas in each selected pair are connected to the inputs of different pairs of matched receiver channels. The logarithmic video output signals from the receiver channels in each pair are subtracted to simultaneously generate first and second monopulse ratios. The monopulse ratios are compared and the ratio representing the forelobe response is selected while the ratio representing the backlobe response is suppressed. If certain acceptance rules are met, the selected ratio is processed to obtain unambiguous angle of arrival information with instantaneous angular coverage over the monitored sector. The array is electronically scanned by a controlled switching system which causes successive antenna sets to be selected, in sequence. Successive selection of the antenna sets in sequence provides a 360° total field of view.

34 Claims, 5 Drawing Figures

METHOD AND APPARATUS FOR ELECTRICALLY SCANNING AN ANTENNA ARRAY IN A MONOPULSE DF RADAR SYSTEM

The present invention relates to monopulse direction finding (DF) radar systems and, more particularly, to a method and apparatus for electrically scanning an antenna array in a monopulse direction finding radar system to provide omniazimuthal coverage and unambiguous angle of arrival information.

Monopulse direction finding radar systems are well known in the art. Such systems use a simultaneous lobing technique wherein a pair of physically separated or offset overlapping antenna beams are utilized at the same time, instead of a single antenna beam which is monitored on a time shared basis. The overlapping antenna beams may be generated by two physically separate antennas or a single lens antenna illuminated by two adjacent feeds. Angle of arrival information is determined by measuring the relative phase or the relative amplitude of a single echo pulse received on each of the beams. The use of a monopulse system is highly desirable in certain applications, particularly in the electronic warfare art, because such a system is immune to pulse-to-pulse amplitude variations between received signals caused by scanning and/or propagation effects.

Scanning of the azimuth may be achieved in a monopulse system by a mechanically rotating a pair of narrow beamwidth antennas. Ideally, the overlapping antenna beams would have a field of view limited to the direction in which same are pointed at any instant in time. As a practical matter, however, this is not the case because the antennas also have backlobes. A backlobe is a response to a signal in the direction which is the reverse or opposite of the direction in which the antenna is pointed. Backlobe responses are usually weaker than the responses to a signal in the direction in which the antenna is pointed (forelobe response). However, sometimes, the presence of a backlobe response makes an unambiguous angle of arrival determination difficult because it cannot be determined whether the received echo signal represents a strong signal picked up on a weak backlobe, or a weak signal picked up on the desired forelobe.

When the antennas are rotated by a mechanical drive, a two-channel rotary joint is required. However, rotary joints and other interconnections necessary in this instance often have narrow frequency responses, usually limited to an octave. Thus, wideband multi-octave antennas, covering a wide frequency reception range, cannot be readily used in mechanically driven scanning systems.

Two separate techniques have been utilized to eliminate the ambiguity in the angle of arrival determination and increase the range of frequency response in monopulse DF radar systems. The first technique combines a fixed omniazimuthal antenna and a rotating narrow beamwidth antenna, each connected to a different channel in a dual channel receiver. The gains of the channels are adjusted such that the response on the channel receiving the output of the omniazimuthal antenna is greater than the weakest backlobe of the narrow beamwidth antenna, but less than the strongest forelobe of the narrow beamwidth antenna. A received signal to be processed to obtain the angle of arrival information is deemed acceptable only if the output of the channel connected to the narrow beamwidth antenna is greater than the output of the channel connected to the omniazimuthal antenna. In this manner, backlobe responses are inhibited.

This technique will, theoretically, permit unambiguous angle of arrival determinations. However, as a practical matter, the physical separation and differences in the characteristics between the two antennas cause unwanted variations in channel responses. These variations in channel responses make the above method of backlobe suppression subject to error. Errors are present because it cannot be guaranteed that the output of the channel connected to the omniazimuthal antenna will always be less than the forelobe response, but greater than the backlobe response of the channel connected to the narrow beamwidth antenna, for a signal in the direction in which the narrow beamwidth antenna is pointed. Thus, completely unambiguous angle of arrival determinations cannot be achieved with this technique.

The second technique for permitting unambiguous angle of arrival determinations utilizes four 90° beamwidth stationary spiral antennas, geographically oriented to cover 360°, in four quadrants. Four reception channels are required, one for each antenna. Specific rules for signal acceptance are utilized for backlobe response suppression. When a signal is received on an antenna connected to one of the four associated receiver channels, it is determined if the signal is also present on either of the channels connected to antennas adjacent to the first antenna. If the signal is present on a channel connected to an adjacent antenna and is less in strength than the first, the signal is accepted and the monopulse ratio of strongest to adjacent next strongest is formed. However, if the signal is present on the antenna channel oriented in the opposite direction, the strength of the two signals is compared and, since the channels are not adjacent, the channel with the strongest signal thereon is considered to be the desired channel. The adjacent next strongest signal is then sought to form the monopulse ratio. In this instance, the next strongest signal may be suppressed and the signal on the boresight channel processed, or both signals may be discarded and the determination made on the next pulse.

The four channel, four antenna system of signal detection is feasible when moderate DF accuracies are required. However, due to the wide beamwidths of the antennas and practical limitations on channel balancing in such a system, the degree of articulation (dB change per degree of azimuth coverage) and the sensitivity of the system are limited.

If better accuracy with omniazimuthal coverage is desired, without physical movement of the antennas, many more fixed antennas of narrower beamwidth, and an equal number of additional receiver channels, would be required. Narrower beamwidth antennas result in enhanced accuracy because of the increased dB per degree of azimuth coverage. Moreover, in a multi-channel system where there is a practical limit on the balance between the channels, system unbalance contributes less error for antennas of narrower beamwidth.

Thus, increasing the number of antennas and the number of receiver channels will permit unambiguous angle of arrival determination and improved accuracy, without decreasing the coverage or reducing frequency response. However, increasing the number of receiver channels is not a practical solution to the accuracy problem. The electronics required for a system having more than four balanced reception channels would be prohibitively expensive. Further, since DF systems are designed for use on mobile craft, most usually for airborne guidance systems and the like, the added space required by the extra electronics and the weight thereof would severely limit the applications for which such systems could be used.

It is, therefore, a prime object of the present invention to provide a method and apparatus for electrically scanning an antenna array in a monopulse DF radar system to provide omnidirectional coverage.

It is a second object of the present invention to provide a method and apparatus for electrically scanning an antenna array in a monopulse DF radar system wherein unambiguous angle of arrival information is obtained.

It is a third object of the present invention to provide a method and apparatus for electrically scanning an antenna array in a monopulse DF radar system wherein enhanced accuracy is achieved.

It is a fourth object of the present invention to provide a method and apparatus for electrically scanning an antenna array in a monopulse DF radar system wherein omniazimuthal coverage is achieved without mechanical rotation of antennas.

It is a fifth object of the present invention to provide a method and apparatus for electrically scanning an antenna array in a monopulse DF radar system wherein reception coverage is achieved over a multi-octave frequency range.

It is a sixth object of the present invention to provide a method and apparatus for electrically scanning an antenna array in a monopulse DF radar system wherein backlobe suppression is reliably achieved.

It is another object of the present invention to provide a method and apparatus for electrically scanning an antenna array in a monopulse DF radar system wherein unity probability of intercept is achieved over the sector of instantaneous angular coverage.

It is still another object of the present invention to provide a method and apparatus for electrically scanning an antenna array in a monopulse DF radar system wherein the sector of instantaneous angular coverage equals 360° times the number of antennas divided into the number of receiver channels.

It is a further object of the present invention to provide a method and apparatus for electrically scanning an antenna array in a monopulse DF radar system wherein pairs of adjacent antennas are utilized to determine the backlobe responses of oppositely oriented adjacent antenna pairs.

It is a still further object of the present invention to provide a method and apparatus for electrically scanning an antenna array in a monopulse DF radar system wherein instantaneous angular coverage of a sector is achieved simultaneously with backlobe suppression.

It is a still further object of the present invention to provide a method and apparatus for electrically scanning an antenna array in a monopulse DF radar system wherein scanning of the antenna array is automatically controlled.

In accordance with the present invention, method and apparatus for electrically scanning the antenna array in a monopulse DF radar system is provided. The antenna array has a plurality of fixed narrow beamwidth antennas geographically oriented to provide omnidirectional coverage. From the antenna array, a set of antennas is selected. The set of selected antennas includes first and second oppositely oriented pairs of adjacent antennas.

The system includes a multi-channel receiver having pairs of matched channels. The antennas of the selected set are operably connected to the receiver channels. Adjacent pairs of antennas are respectively connected to pairs of matched channels, with each antenna in the pair being connected to a different one of the channels in the matched channel pair. Each pair of matched channels simultaneously generates a monopulse ratio based on the signals received by the adjacent antenna pair of the selected set connected thereto.

Backlobe responses of the antennas in the selected antenna sets are suppressed. Suppression of the backlobe responses is achieved by comparing the simultaneously generated monopulse ratios. The ratio which represents the forelobe response is selected for processing. The ratio which represents the backlobe response is inhibited.

If the signals meet certain acceptance rules, the selected monopulse ratio is processed to obtain the angle of arrival information. Instantaneous angular coverage for the field of view of the antennas in the selected set is obtained for each processed ratio.

In order to provide omnidirectional coverage, successive antenna sets are selected in sequence such that the selected sets include each of the antennas. Selection is made by an electronically controlled switching system which is controlled to select the required antenna sets in accordance with a programmed scan control circuit. In this manner, the antenna array is electronically scanned.

The antenna sets may be selected in several different modes. Regardless of the mode of selection, each selected set always includes two oppositely oriented pairs of adjacent antennas. In one mode, antennas for the sets are selected in an overlapping manner, such that each selected pair of adjacent antennas in each set includes one antenna from each of the adjacent pairs of the previously selected set. For example, if eight antennas, designated $ANT_1$, $ANT_2$ ... $ANT_8$, respectively, are present in the array, antennas $ANT_1$ and $ANT_2$ may comprise one adjacent pair and antennas $ANT_5$ and $ANT_6$, oriented in an opposite direction to antennas $ANT_1$ and $ANT_2$, may comprise the other adjacent pair of the first selected set. Antennas $ANT_1$ and $ANT_2$, respectively, will be connected to the inputs of different channels in one pair of matched channels. Antennas $ANT_5$ and $ANT_6$, respectively, will be connected to the inputs of different channels in the other pair of matched channels. Simultaneous monopulse ratios are generated by each matched channel pair. The ratios are compared and the ratio representing the forelobe response selected, the ratio representing the backlobe response being inhibited. If certain acceptance rules are met, the selected ratio is processed to obtain angle of arrival information with respect to the sector covered by antennas $ANT_1$, $ANT_2$, $ANT_5$ and $ANT_6$.

In the overlapping selection mode, the next set of selected antennas in succession will include two antenna pairs, each pair having an antenna from one of the previously selected pairs. Thus, the second set may include antennas $ANT_2$ and $ANT_3$ as one pair, and antennas $ANT_6$ and $ANT_7$ as the other pair. The third set may include antennas $ANT_3$ and $ANT_4$, as one pair, and antennas $ANT_7$ and $ANT_8$, as the other pair. The fourth set may include antennas $ANT_4$ and $ANT_5$ as one pair, and antennas $ANT_8$ and $ANT_1$, as the second pair.

For each selected set, monopulse ratios are generated and compared to suppress the backlobe response. The selected ratio is then processed to provide coverage for the sector covered by the antennas in that set. Processing signals from successive sets until all antennas have been selected provides omnidirectional coverage without any discontinuity.

In a second selection mode, the antennas selected for each even numbered set are the same as are selected for the previous odd numbered set, but in reverse order. If eight antennas are present in the array, then eight successive sets must be selected in order to provide omnidirectional coverage.

For example, assume antennas $ANT_1$ and $ANT_2$ are selected for the first pair, and antennas $ANT_5$ and $ANT_6$ are selected for the second pair, in the first set. The second set will include the same antennas, but in reverse order. Thus, the second set will include antennas $ANT_2$ and $ANT_1$, as the first pair, and antennas $ANT_6$ and $ANT_5$, as the second pair.

The order of selection of antennas within a given set is important because antennas are connected to receiver channels in a specific order. Assume four receiver channels, designated $C_1$, $C_2$, $C_3$, $C_4$ are present, channels $C_1$ and $C_2$ forming one matched pair and channels $C_3$ and $C_4$ forming the second matched pair. When the first antenna set is selected, antennas $ANT_1$ and $ANT_2$ will be connected to channels $C_1$ and $C_2$, respectively, and antennas $ANT_5$ and $ANT_6$ will be connected to channels $C_3$ and $C_4$, respectively. When the second antenna set is selected, antennas $ANT_2$ and $ANT_1$ will be connected to channels $C_1$ and $C_2$, respectively, and antennas $ANT_6$ and $ANT_5$ will be connected to channels $C_3$ and $C_4$, respectively.

The purpose of this reversal of antenna order is to permit cancellation of any unbalance between channels in a matched channel pair. This is achieved by taking the average value of the monopulse ratios generated by a matched channel pair for each pair of successive odd and even numbered sets. Thus, for each pair of successive odd and even numbered sets, only a single monopulse ratio from each matched channel pair is processed, that ratio being the average of the ratios generated by the matched channel pair when connected to the same pair of adjacent antennas, first in one order and then in the reverse order.

The third set of selected antennas may include antennas $ANT_2$, $ANT_3$ and $ANT_6$, $ANT_7$. The fourth set may include antennas $ANT_3$, $ANT_2$ and $ANT_7$, $ANT_6$. The fifth set may include antennas $ANT_3$, $ANT_4$ and $ANT_7$, $ANT_8$. The sixth set may include antennas $ANT_4$, $ANT_3$ and $ANT_8$, $ANT_7$. The seventh set may include antennas $ANT_4$, $ANT_5$ and $ANT_8$, $ANT_1$. The last set in the sequence will include antennas $ANT_5$, $ANT_4$ and $ANT_1$, $ANT_8$.

In the averaging mode of selection, the advantages of overlapping coverage with a 360° field of view are obtained. However, the additional advantage of cancellation of variations due to unbalance between matched receiver channels is also achieved.

In certain instances, high sidelobe levels may lead to ambiguities in the angle of arrival determination. In such instances, it is desirable to accelerate the selection procedure to permit recording of the amplitudes of the received signals on each of the antennas as quickly as possible. This method will resolve sidelobe ambiguities by permitting quicker comparison and selection of the strongest received signal as the forelobe response. Sidelobe errors are reduced because, for some antenna patterns, it is possible that very strong signals might give an erroneous pair ratio which would otherwise be acceptable, thereby leading to an incorrect angle of arrival determination.

In the accelerated selection mode, the first set of antennas may include antennas $ANT_1$ and $ANT_2$ and antennas $ANT_5$ and $ANT_6$. In the second set, antennas $ANT_3$ and $ANT_4$ and antennas $ANT_7$ and $ANT_8$ will be selected. Thus, after the second set of antennas has been selected, the relative amplitudes of all eight of the antenna beams can be determined to permit selection of the strongest signal. Noting which of the antennas received the strongest signal, it becomes possible to resolve which antenna pair receives the forelobe response.

The sequence in the accelerated mode is completed by again selecting each antenna. In the third set, antennas $ANT_2$, $ANT_3$ and antennas $ANT_6$ and $ANT_7$ are selected. In the fourth set, antennas $ANT_4$, $ANT_5$ and antennas $ANT_8$, $ANT_1$ are selected.

Determination of the angle of arrival information can be made either after each successive antenna set selection or the information can be stored until the scan of all of the antennas has been completed and then made. To perform the determination, certain rules of acceptance are utilized. From the patterns of two antennas squinted by 360°/N, where N is the number of antennas in the array, the maximum difference to be expected between adjacent antennas can be determined by analysis of the pattern responses of the adjacent antennas. Knowing this difference permits the establishment of rules of acceptance of a signal.

First it is determined if a signal of maximum magnitude is present at the output of a channel and, if so, on which channel. Next it is determined if a signal of next maximum magnitude is present at the output of a channel and, if so, on which channel. [Determination of whether the differences between received pattern responses are below the maximum expected difference is achieved by appropriate adjustment of the dynamic range of the system.] If the signals of maximum and next maximum magnitudes are received on adjacent channels and if the difference in the signals is less than the expected maximum difference, this indicates that adjacent antennas are receiving the highest signals and the ratio is processed to obtain the angle of arrival information. If the received signals do not meet the acceptance rules, the ratio is not processed and new ratios are obtained on the next scan step.

The electronic scanning of the antenna array is accomplished by a switching circuit comprising a first set of single pole, double throw switches, a second set of single pole, four throw switches and, in the case of the averaging mode, a third set of single pole, double throw switches. The state of each of the switches is electronically controlled by a scan control circuit which causes the switching circuit to select the antennas in each set by connecting the antenna outputs to the appropriate receiver channel inputs. For each step in the scan sequence, different antenna sets are selected in accordance with a predetermined program.

In the first switch set, each switch has one RF input and two RF outputs. In the second switch set, each switch has four RF inputs and one RF output. The RF input of each of the switches in the first switch set is connected to the RF output from a different one of the antennas. The RF output of each of the switches in the second switch set is connected through the switches in the third set (which merely serve to reverse same) to the RF input of a different one of the receiver channels. The RF outputs of the switches of the first switch set are connected to the RF inputs of the switches in the second switch set. The scan control circuit is connected to control the state of each switch. The program of the scan control circuit causes the switches to connect the selected antennas to the appropriate channel inputs, for a prescribed time duration, during which monopulse ratios are formed, backlobe responses inhibited and the signals tested to determine if same meet the acceptance rules. If they do, the angle of arrival determination is made. Thereafter, the state of the switches is altered to select the next set of antennas. The process may continue until all sets are selected, and then may repeat itself.

The program of the scan control circuit determines which antennas are to be selected in each set, the order of selection, and the number of sets selected in sequence. Thus, the program determines which selection mode is used.

To the accomplishment of the above, and to such other objects as may hereinafter appear, the present invention relates to a method and apparatus for electrically scanning an antenna array in a monopulse DF radar system as described in the following specification and recited in the annexed claims, taken together with the accompanying drawings, wherein like numerals refer to like parts and in which:

Figure 1:
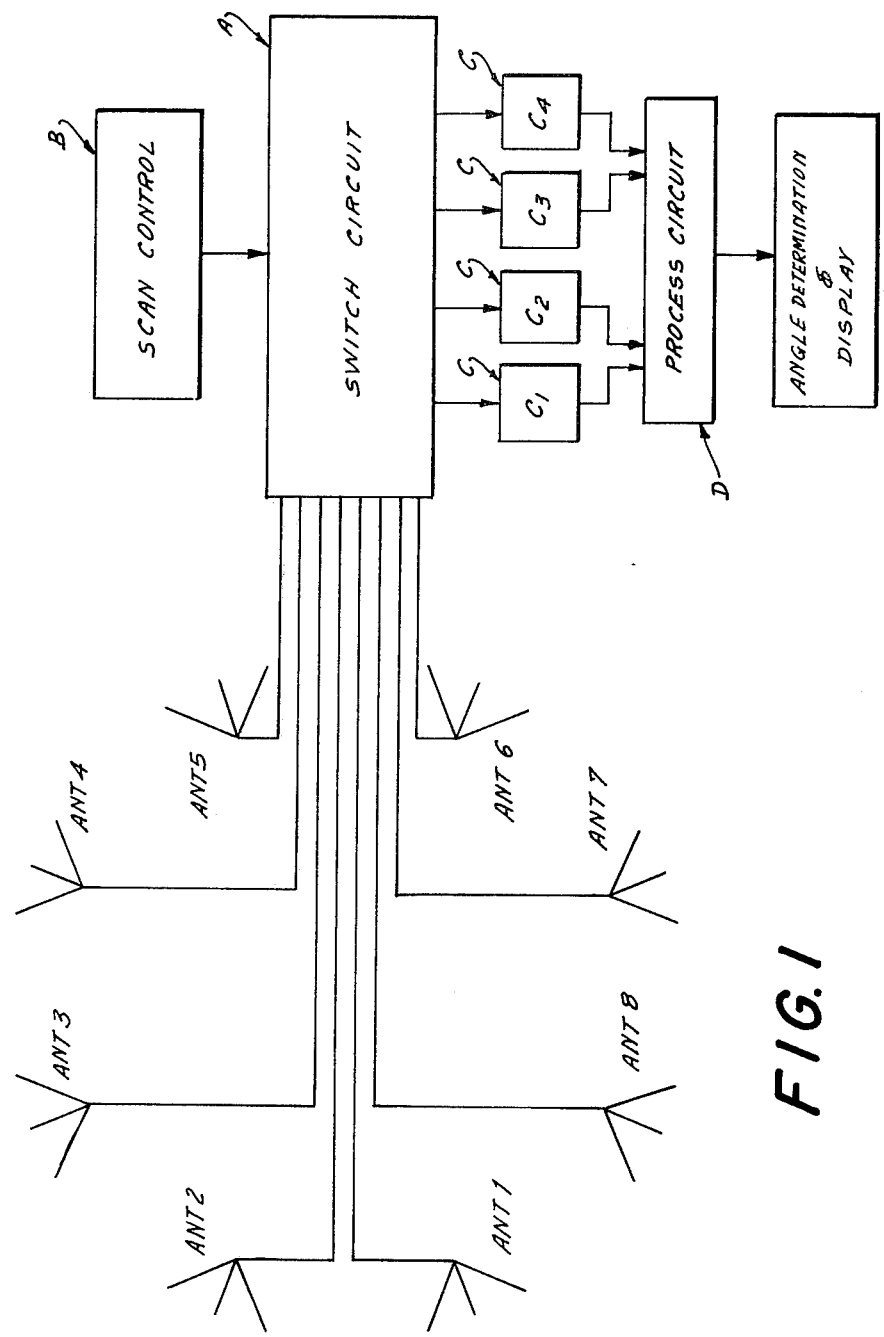
FIG. 1 is a block diagram of the overall system of the present invention.

As seen in FIG. 1, the system of the present invention includes an antenna array of a plurality of fixed, narrow beamwidth antennas, geographically oriented to provide omnidirectional coverage. The antenna array consists of eight antennas, $ANT_1$, $ANT_2$, $ANT_3$, $ANT_4$, $ANT_5$, $ANT_6$, $ANT_7$, and $ANT_8$, respectively. Each of the antennas is permanently positioned with respect to the others and has a beamwidth covering a 45° arc. Thus, when considered in aggregate, the eight antennas cover a 360° field of view. The R.F. output from each antenna is connected to a switching circuit, generally designated A. Switching circuit A serves to select four of the eight antenna output lines, in accordance with the commands from a scan control circuit, generally designated B, connected thereto. The selected antenna outputs are respectively connected to one of four receiver channels, generally designated C. Each of the receiver channels C filters and detects the R.F. input signal thereto. After the detection, the output video, which may be pulse or CW, is fed to a logarithmic amplifier which takes the logarithm of the video signal for each channel. The logarithmic video output from each channel is connected to a processing circuit, generally designated D, wherein monopulse ratios are formed by subtracting the logarithmic video output of each pair of matched receiver channels C. Processing circuit D also includes a backlobe suppression circuit and an acceptance circuit. If the received signals meet certain rules of acceptance, the ratio representing the forelobe response is connected to an angle determination and display circuit, generally designated E, which may comprise circuitry designed to generate a numerical representation of the angle of arrival information or a graphical display thereof, or both.

The system of the present invention may operate in any one of three modes. In the overlapping mode, successive sets are selected with common antennas, such that each selected pair of adjacent antennas includes an antenna from one of the adjacent pairs of the previously selected set. In the averaging mode, the antennas selected for each even numbered set are the same as are selected for the previous odd numbered set, but in reverse order. In the accelerated mode, each selected set of antennas includes only antennas which were not selected in the previous set.

Each mode has its particular advantages. In the overlapping mode, the full 360° azimuth is covered without any discontinuity. In the averaging mode, in addition to continuity of coverage, unbalances in the channels of each receiver channel pair are cancelled by taking the average value of the monopulse ratio of successive selected sets. In the accelerated mode, sidelobe errors are reduced when very strong signals are present which might result in an erroneous ratio which would otherwise appear to be acceptable.

Figure 2:
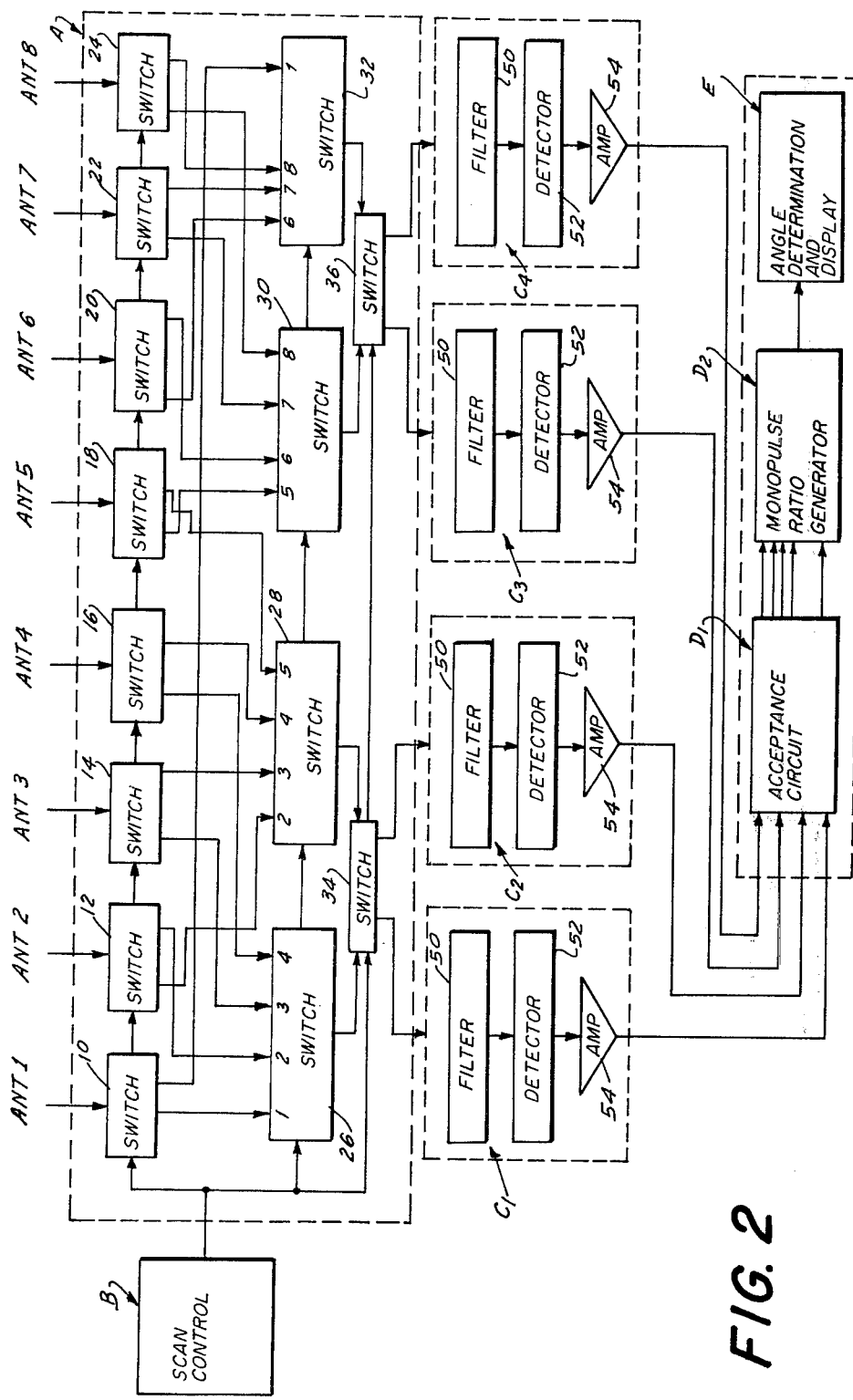
FIG. 2 is a more detailed block diagram of the switching system and receiver channels of the system of the present invention.

The switching circuit A for each of the three modes is illustrated in greater detail in FIG. 2. Switching circuit A comprises three tiers of switches. The first tier of switches comprises eight single pole, double throw switches 10, 12, 14, 16, 18, 20, 22 and 24, each of which has its RF data input connected to the RF output of a different one of the antennas $ANT_1$, $ANT_2$, $ANT_3$, $ANT_4$, $ANT_5$, $ANT_6$, $ANT_7$, $ANT_8$, respectively. Each of the switches 10, 12, 14, 16, 18, 20, 22, 24 has two RF data outputs. Switches 10, 12, 14, 16, 18, 20, 22, 24 may be any electronically controllable single pole, double throw RF switch, such as presently available from Alpha Industries as model MT3681-H, or the like.

The second tier of switches comprises four single pole, four throw throw RF switches 26, 28, 30 and 32. Each of the switches 26, 28, 30 and 32 has four RF data inputs and a single RF data output. Switches 26, 28, 30 and 32 may be any electronically controllable single pole, four throw RF switch, such as presently available from Alpha Industries as models MT3654-H or MT7664-H.

The four RF data inputs of switch 26 are respectively connected to the first RF data output of switch 10, the second RF data output of switch 12, and the first RF data outputs of switches 14 and 16. The four RF data inputs of switch 28 are connected, respectively, to the first RF data output of switch 12 and the second RF data outputs of switches 14, 16 and 18. The four RF data inputs of switch 30 are respectively connected to the first RF data output of switch 18, the second RF data output of switch 20, and the first RF data outputs of switches 22 and 24. The four RF data inputs of switch 32 are connected, respectively, to the first RF data output of switch 20 and the second RF data outputs of switches 20, 22 and 10.

The third tier of switches comprises a pair of electronically controllable single pole, double throw RF switches, such as Alpha Industries MT3654-H or MT7664-H or the like. Switch 34 has RF data inputs which are connected to the RF data outputs of switches 26 and 28, respectively. Switch 36 has RF data inputs which are connected to the RF data outputs of switches 30 and 32, respectively.

The bias inputs (equal in number to the number of possible states for each switch) of each of the switches 10, 12, 14, 16, 18, 20, 22, 24, 26, 28, 30, 32, 34 and 36 are connected to the output of scan control circuit B. Scan control circuit B is programmed to cause the switches to select the appropriate antennas in accordance with the mode of operation which is selected for the system. Successive sets of antennas are selected in sequence in accordance with the operating mode.

Figure 3:
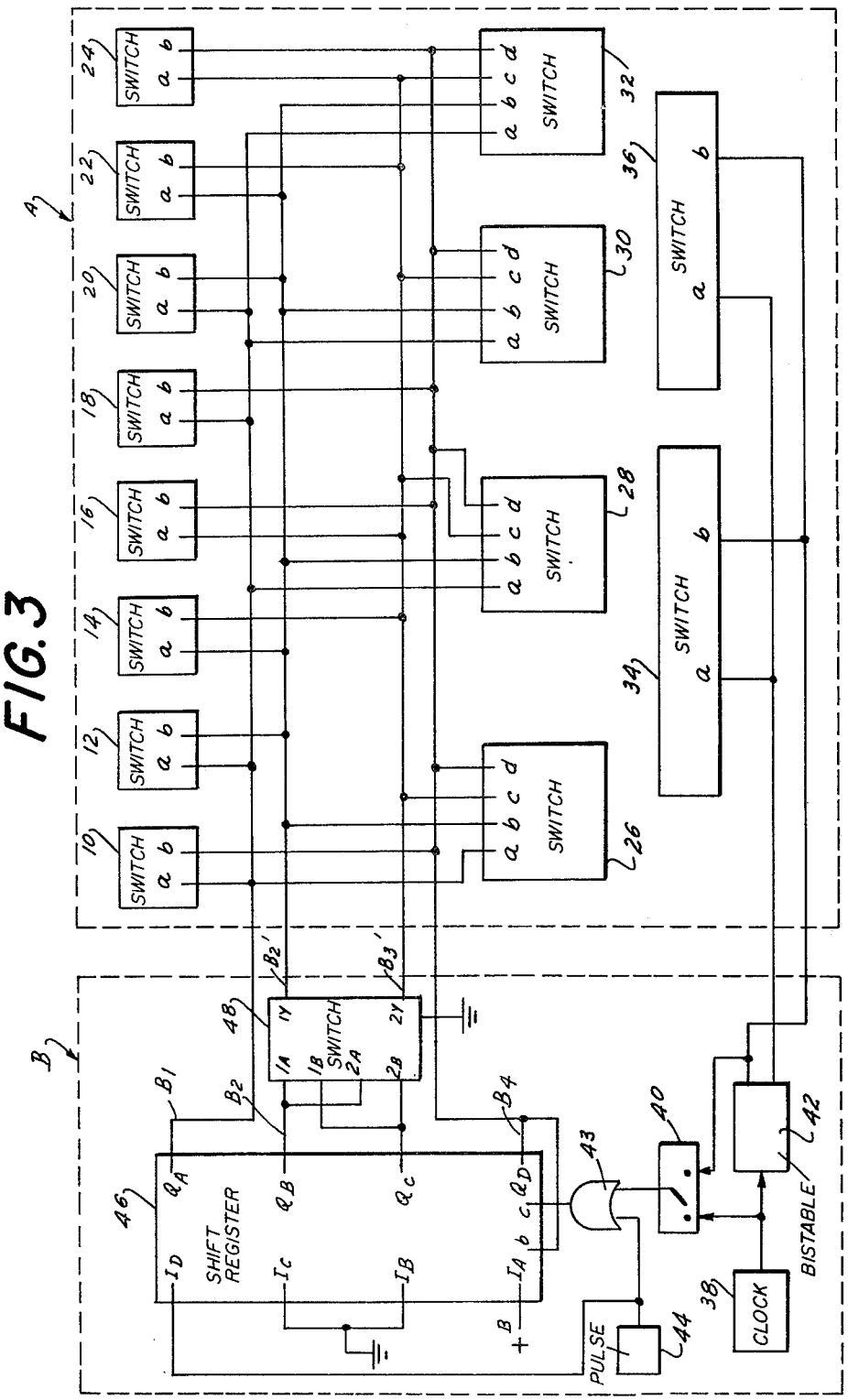
FIG. 3 is a block diagram of the scan control circuit of the system of the present invention.

FIG. 3 illustrates the structure of scan control circuit B and the manner in which same is connected to the bias inputs of switches 10 through 36 and, thus, controls the states thereof. Scan control circuit B comprises a clock 38 capable of generating a timing signal at a predetermined frequency. (Clock 38 may be used as the central timing signal generator for the entire system, if desired. However, for simplicity, the connections required for synchronization of the entire system are not shown.) The output of clock 38 is connected to one input of a selector switch 40. The output of clock 38 is also connected to control the state of a bistable circuit 42, one output of which is connected to the other input of selector switch 40. The output of selector switch 40 is connected to one input of an OR gate 43 (No. 5432 available from Texas Instruments Corp. or the like). The other input of OR gate 43 is connected to the output of a pulse generator 44 which generates a "power on reset" (POR) pulse.

The output of OR gate 43 is connected to the 'C' input of a shift register 46 (such as No. 54195 available from Texas Instruments Corp., or the like). The action of the POR pulse with OR gate 43 applies a clock and a load signal to the BIAS control of shift register 46. The shift register 46 is four bits long with outputs $Q_A$, $Q_B$, $Q_C$, $Q_D$ applied to bias lines $B_1$, $B_2$, $B_3$, $B_4$, respectively.

The bias inputs for switches 10, 12, 14, 16, 18, 20, 22, 24 and 26, 28, 30, 32 are connected to bias lines $B_1$, $B_2$, $B_3$ and $B_4$. A logic "0" level (represented by a 0 to 0.7 volt level at 2.0 mA) will turn a switch off, opening it. A logic "1" level (represented by a 2.1 to 5 volt level at 40 mA) will turn the switch on. Each pole of the switch can, thus, be made to go "on" or "off" by the application of the appropriate signal level on the bias line connected thereto.

In the overlapping mode, selector switch 40 is set to connect the output of clock 38 to the input of OR gate 43. The POR pulse presets register 46 through gate 43 to cause output $Q_A$ to be "on" or "high" and outputs $Q_B$, $Q_C$, $Q_D$ to be "off" or "low". This occurs since the register input $I_A$ is tied to the supply source B+, while register inputs $I_B$, $I_C$ and $I_D$ are tied to ground (off).

A logic "1" signal applied to line $B_1$ will cause the respective RF data inputs of switches 10, 12, 18 and 20 (because the "a" bias inputs of each are connected to $B_1$) to be connected to the leftmost RF data output thereof. The bias inputs of switches 26, 28, 30 and 32 are also connected to the bias lines. When the logic "1" is applied to line $B_1$, this causes the first or lefthand RF data input of each of the switches 26, 28, 30, 32 to be connected to the RF data output thereof (because the "a" bias inputs of each are connected to $B_1$). The result is that $ANT_1$, $ANT_2$, $ANT_5$ and $ANT_6$ are each connected to the input of receiver channel $C_1$, $C_2$, $C_3$, $C_4$, respectively.

After it has been determined that it is time to sequence (after a given time duration for signal computation to be completed), a clock signal is applied to shift register 46 through switch 40 and gate 43, thereby shifting the high bit to $Q_B$ causing the bias line $B_2$ to become high and the others low. When a logic "1" is applied to the bias line $B_2$, it causes the RF data inputs of switches 12, 14, 20 and 22 to be connected to the righthand RF data output of switch 12, the lefthand RF data output of switch 14, the righthand RF data output of switch 20, and the lefthand RF data output of switch 22, respectively. The bias input for the second terminal of each of the switches 26, 28, 30 and 32 is connected to bias line $B_2$ which causes each of the switches 26, 28, 30 and 32 to connect its second RF data input terminal to its RF data output terminal. The result is that the RF outputs of antennas $ANT_2$, $ANT_3$, $ANT_6$ and $ANT_7$ are respectively connected to the RF inputs of channel $C_1$, $C_2$, $C_3$ and $C_4$.

During the next step in the sequence, bias line $B_3$ has a logic "1" applied thereto. This causes the RF data input terminal of switches 14, 16, 22 and 24 to be respectively connected to the righthand RF data output terminal of switch 14, the lefthand RF data output terminal of switch 16, the righthand RF data output terminal of switch 22 and the lefthand RF data output terminal of switch 24, such that $ANT_3$, $ANT_4$, $ANT_7$ and $ANT_8$ are, respectively, connected to the third RF terminal of each of the switches 26, 28, 30, 32. The "c" bias terminals of the switches 26, 28, 30 and 32 are also connected to bias line $B_3$, thus causing the third RF data input terminal of each switch to be connected to the RF data output thereof. As a result, $ANT_3$, $ANT_4$, $ANT_7$ and $ANT_8$ are respectively connected to the RF inputs of channels $C_1$, $C_2$, $C_3$ and $C_4$.

On the next sequence, the RF data input terminals of switches 10, 16, 18 and 24 are, respectively, connected to the righthand RF data output of switch 10, the righthand RF data output of switch 16, the righthand RF data output of switch 18 and the righthand RF data output of switch 24. This connects $ANT_1$, $ANT_4$, $ANT_5$ and $ANT_8$ to the fourth RF data input terminal of switches 32, 26, 28 and 30, respectively. The "d" bias inputs of each of the switches 26, 28, 30 and 32 are also tied to bias line $B_4$, such that when bias line $B_4$ goes high, the fourth RF input data terminal of each of the switches is connected to the RF data output thereof. As a result, $ANT_4$, $ANT_5$, $ANT_8$ and $ANT_1$ are connected to the RF inputs of receiver channels $C_1$, $C_2$, $C_3$ and $C_4$, respectively. In summary, the switch sequence is as follows:

TABLE I

| SCAN STEP | RECEIVER CHANNEL CONNECTION | | | |
|---|---|---|---|---|
| No. | $C_1$ | $C_2$ | $C_3$ | $C_4$ |
| I | $ANT_1$ | $ANT_2$ | $ANT_5$ | $ANT_6$ |
| II | $ANT_2$ | $ANT_3$ | $ANT_6$ | $ANT_7$ |
| III | $ANT_3$ | $ANT_4$ | $ANT_7$ | $ANT_8$ |
| IV | $ANT_4$ | $ANT_5$ | $ANT_8$ | $ANT_1$ |

It may be seen from table I that a monopulse pair ratio is formed in an overlapping manner, that is, the $C_1$, $C_2$ channel pair, for example, forms the ratio of the outputs of antennas $ANT_1$ and $ANT_2$, then $ANT_2$ and $ANT_3$, then $ANT_3$ and $ANT_4$, then $ANT_4$ and $ANT_5$, etc. The receiver channel pair $C_3$, $C_4$ forms the ratios from antennas $ANT_5$ and $ANT_6$, then $ANT_6$ and $ANT_7$, then $ANT_7$ and $ANT_8$, then $ANT_8$ and $ANT_1$ etc. Thus, the full 360° azimuth is covered without any discontinuity by the monopulse technique with its advantage of signal ratio taking or normalization.

The system of the present invention may also operate in the averaging mode. In this mode, the RF inputs to each channel pair are reversed prior to advancing to the next selected antenna set. The purpose of this procedure is to permit cancellation of any unbalance in a channel pair by taking the average value of the monopulse ratio developed in successive scans.

In this case, switches 34 and 36 serve to reverse the connections to the inputs to the paired channels on alternate scans. For instance, on the first scan step, the RF outputs of antennas $ANT_1$, $ANT_2$, $ANT_5$ and $ANT_6$ are connected to the RF inputs of channels $C_1$, $C_2$, $C_3$, $C_4$, respectively. However, on the next step, instead of connecting the RF outputs of antennas $ANT_2$, $ANT_3$, $ANT_6$ and $ANT_7$ to the RF inputs of channels $C_1$, $C_2$, $C_3$, $C_4$, as in the overlapping mode, the RF inputs to the channel pairs are reversed and the RF output of antennas $ANT_2$, $ANT_1$, $ANT_6$ and $ANT_5$ are connected, respectively, to the RF inputs of channels $C_1$, $C_2$, $C_3$ and $C_4$. This is accomplished by simply causing switches 34 and 36 to alter their states, such that the channel input connections are reversed.

In order to accomplish this result, the output of clock 38 is connected to bistable circuit 42 which has first and second output terminals. The first output terminal is connected to the "a" bias input terminal of each of switches 34 and 36 and the second output terminal is connected to the "b" bias input control terminal of each of switches 34 and 36. One of the outputs of circuit 42 will be high while the other is low and the states thereof will reverse after each clock pulse. Thus, on the first clock pulse, the first bias inputs of switches 34 and 36 will be high, causing the RF data outputs of switches 26, 28, 30 and 32 to be connected to the RF inputs of receiver channels $C_1$, $C_2$, $C_3$, $C_4$, respectively. On the next clock pulse, the state of the outputs of circuit 42 will reverse, thereby reversing the polarity of switches 34 and 36, such that the respective RF data outputs of switches 28, 26, 32 and 30 are now connected to the RF inputs of receiver channel $C_2$, $C_1$, $C_4$ and $C_3$, respectively.

One of the outputs of circuit 42 is connected, through selector switch 40, to the input of OR gate 43 which, in turn, indexes shift register 46 in the identical manner described above. Selector switch 40 serves to select the source of clock signals to OR gate 43. When selector switch 40 is actuated to select the averaging mode, switching circuit A and scan control circuit B act precisely as described above with respect to the overlapping mode, except that the shift register is indexed on every other clock pulse and the states of switches 34 and 36 are reversed on successive scan steps. The scan sequence is set forth in the following table:

TABLE II

| SCAN STEP No. | RECEIVER CHANNEL CONNECTION | | | |
|---|---|---|---|---|
| | $C_1$ | $C_2$ | $C_3$ | $C_4$ |
| I | $ANT_1$ | $ANT_2$ | $ANT_5$ | $ANT_6$ |
| $I_R$ | $ANT_2$ | $ANT_1$ | $ANT_6$ | $ANT_5$ |
| II | $ANT_2$ | $ANT_3$ | $ANT_6$ | $ANT_7$ |
| $II_R$ | $ANT_3$ | $ANT_2$ | $ANT_7$ | $ANT_6$ |
| III | $ANT_3$ | $ANT_4$ | $ANT_7$ | $ANT_8$ |
| $III_R$ | $ANT_4$ | $ANT_3$ | $ANT_8$ | $ANT_7$ |
| IV | $ANT_4$ | $ANT_5$ | $ANT_8$ | $ANT_1$ |
| $IV_R$ | $ANT_5$ | $ANT_4$ | $ANT_1$ | $ANT_8$ |

It should be appreciated with respect to the averaging mode that while the state of the shift register shifts at one-half the rate at which same advances during the overlapping mode, each scan step takes the same amount of time, that is, one clock pulse, because the RF output of switches 34 and 36 changes with each clock pulse. Therefore, during operation of the system in the averaging mode, each scan of the entire antenna array takes twice as much time as a scan of the entire array would in the overlapping mode. However, the cancellation of unbalance between channels is a significant advantage in certain applications and, therefore, warrants the extra scan time involved.

In some instances, it may be desirable to compare sequence-to-sequence DF pair measurements to further resolve side lobe ambiguities. In this case, the strongest signal path can be considered the actual DF. This feature can be used to minimize false DF measurements in certain cases of high sidelobe levels that might cause ambiguities.

In this case, it is desirable to modify the above-noted switching sequences to permit recording of amplitudes of all eight antennas as quickly as possible. This mode of operation is the accelerated mode and antenna selection is accomplished in accordance with the sequence set forth in the following table:

TABLE III

| SCAN STEP No. | RECEIVER CHANNEL CONNECTION | | | |
|---|---|---|---|---|
| | $C_1$ | $C_2$ | $C_3$ | $C_4$ |
| I | $ANT_1$ | $ANT_2$ | $ANT_5$ | $ANT_6$ |
| II | $ANT_3$ | $ANT_4$ | $ANT_7$ | $ANT_8$ |
| III | $ANT_2$ | $ANT_3$ | $ANT_6$ | $ANT_7$ |
| IV | $ANT_4$ | $ANT_5$ | $ANT_8$ | $ANT_1$ |

This switching sequence is implemented by switching selector switch 40 back to its original position (overlapping mode) such that each clock pulse indexes shift register 46. A polarity reversing switch 48, such as chip #54157 available from a number of different chip manufacturers, connected to bias lines $B_2$ and $B_3$, is actuated to interchange the signals thereon. Therefore, in this mode, the signal appearing on output $Q_B$ is fed to line $B_3$ and the signal appearing on output $Q_C$ is fed to line $B_2$. Switches 34 and 36 are not used in this mode and the state thereof remains unchanged.

When line $B_1$ is high, the RF outputs of antennas $ANT_1$, $ANT_2$, $ANT_5$ and $ANT_6$ are connected to the RF inputs of receiver channels $C_1$, $C_2$, $C_3$, $C_4$, respectively. When shift register 46 is indexed, $Q_B$ generates a high output on line $B_3$ causing RF outputs of antennas $ANT_3$, $ANT_4$, $ANT_7$ and $ANT_8$ to be connected to the inputs of receiver channels $C_1$, $C_2$, $C_3$, $C_4$, respectively. On the next indexing of shift register 46 output $Q_C$ becomes high causing bias line $B_2$ to become high, causing the RF outputs of antennas $ANT_2$, $ANT_3$, $ANT_6$ and $ANT_7$ to be connected to the RF inputs of receiver channel $C_1$, $C_2$, $C_3$, $C_4$, respectively. On the next indexing of shift register 46 output $Q_D$ becomes high as does bias line $B_4$, causing the RF outputs of antennas $ANT_4$, $ANT_5$, $ANT_8$ and $ANT_1$ to be connected to the RF inputs of channels $C_1$, $C_2$, $C_3$, $C_4$, respectively.

In the accelerated mode, by the time the second scan step is completed, the relative amplitudes of all eight of the antenna beams can be determined to permit the determination of the strongest signal. This is done to reduce sidelobe errors since, for some antenna patterns, it is possible that very strong signals might give an erroneous pair ratio that would otherwise appear to be acceptable, leading to an incorrect DF result. By noting which one of the antennas actually receives the stronger signal, it is possible to resolve which pair is correct, the desired one being the pair with the strongest signal. The problem cited here may occur for very strong signals sufficient to appear on both sidelobes of a wrong pair. It is assumed that the strongest signal will stay so for the duration of both steps I and II, as shown here.

As seen in FIG. 2, each of the receiver channels $C_1$, $C_2$, $C_3$, $C_4$ comprises a filter 50 and a detector 52. The R.F. input to each receiver channel is filtered and detected. After detection, the output video, which may be pulse or CW, is fed to a logarithmic amplifier 54 which takes the logarithm of the video output for each channel. Channels $C_1$ and $C_2$ form one pair of channels, and channels $C_3$ and $C_4$ form a second pair of channels, and the channels within each pair are identical, or matched. By subtracting the logarithmic video outputs of the matched receiver channels, the difference of the logs results. This difference of the logs is mathematically equivalent to the log of the ratio, which is the desired monopulse signal. The pairing of channel $C_1$ with $C_2$ and $C_3$ with $C_4$ provides two such ratios when connected to four antennas.

Figure 4:
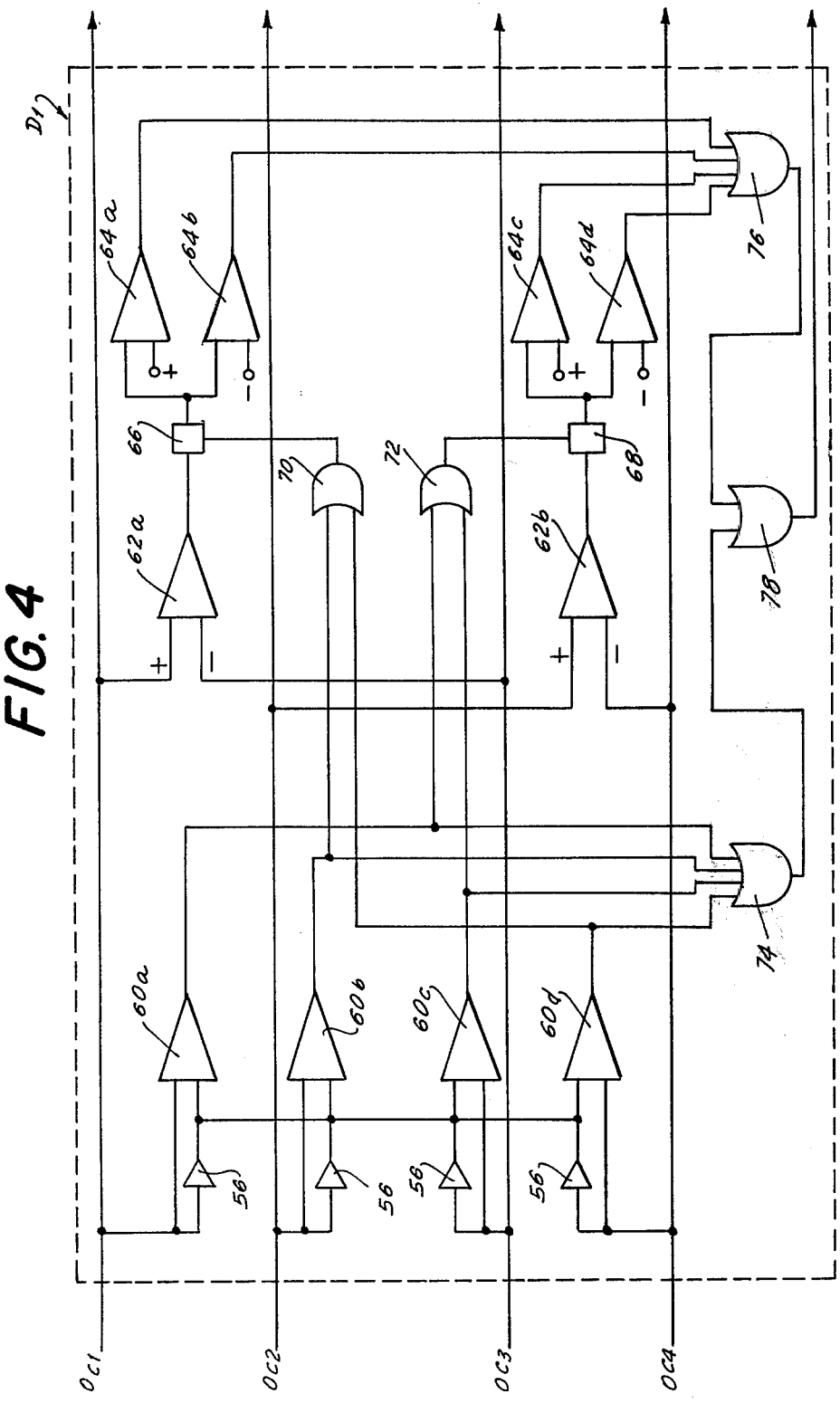
FIG. 4 is a block diagram of the acceptance circuit of the system of the present invention.

However, before the monopulse ratios are formed, the log video outputs of each of the channels $C_1$, $C_2$, $C_3$, $C_4$ are connected to the inputs of an acceptance circuit $D_1$, illustrated in detail in FIG. 4. The dynamic range of circuit $D_1$ is adjusted to implement the necessary acceptance rules.

The purpose of the acceptance circuit $D_1$, illustrated in FIG. 4, is to determine if one of the output signals from the receiver channels, designated $OC_1$, $OC_2$, $OC_3$, $OC_4$, respectively, has the maximum magnitude and if one of the receiver channels has a signal with next maximum magnitude and, if so, whether the receiver channels with the maximum and next maximum signals represent adjacent antennas. This determination is required for all of the modes discussed herein. Each of the video outputs $OC_1$, $OC_2$, $OC_3$, $OC_4$ are connected to the input of a different "OR" gate amplifier 56. The outputs of each of the amplifiers 56 are tied together on line 58 upon which will always appear the sum of the values of the four input signals, offset by a preset amount. Each of the four input signals are then compared to the magnitude on line 58 by comparators 60a, 60b, 60c, 60d. Each of the comparators 60a, 60b, 60c, 60d may be a Model LM106-H available from Texas Instruments Corporation or National Semiconductor, or the like. The output of a comparator 60 will be a high or "1" if the compared video output from the channel connected thereto is greater than the offset sum. Since this will only occur for the maximum signal, as compared to the summed maximum of the preceding stages, identification of which of the channel outputs is maximum can be determined by noting which of the four outputs of the respective comparators 60 is high or logic "1". As a practical matter, the summed maximum is slightly offset to insure that it is less than the compared maximum.

Next, it is determined whether a signal having a next adjacent maximum magnitude exists. If it does, it is determined whether the channel having the next maximum output signal represents an antenna which is adjacent the antenna represented by the channel having the maximum output signal. This is done by a pair of operational amplifiers 62a, 62b. The inputs of operational amplifier 62a are $OC_1$ and $OC_3$, whereas the inputs of operational amplifier 62b are $OC_2$ and $OC_4$, respectively. The output of each of the operational amplifiers 62 will either be positive or negative, depending upon the magnitude of the input signals thereto. For example, if $OC_1$ is greater than $OC_3$, the operational amplifier 62a, connected to receive these signals, will have an output which is positive. On the other hand, if $OC_1$ is less than $OC_3$, the output of operational amplifier 62a will be negative. A typical device which could be used to perform this function is available from Harris and Intersil Co. as model Type 2-2520, or the like.

The output of operational amplifier 62a is connected to one of the inputs of operational amplifiers 64a and 64b. The other input of amplifier 64a is connected to a positive source, whereas the other input of amplifier 64b is connected to a negative source. Similarly, the output of amplifier 62b is connected to one of the inputs of amplifiers 64c and 64d. By comparing the outputs of operational amplifiers 62 with the source inputs to amplifiers 64 connected thereto, the signal with the next maximum can be determined.

For instance, assume $OC_2$ to be determined as the maximum signal. This would require that the two adjacent outputs $OC_1$ and $OC_3$ be tested to determine if either is the next maximum signal. This is achieved by gates 66, 68, located at the outputs of amplifiers 62a and 62b, respectively. The outputs of amplifiers 60a and 60c are connected to the inputs of an OR gate 70. Likewise, the outputs of amplifiers 60b and 60d are connected to the inputs of an OR gate 72. The output of OR gate 70 controls gate 66 and the output of OR gate 72 controls gate 68. Only one of the inputs to gates 70 and 72 will be high, indicating which signal is maximum. The OR gate which receives the high signal will serve to turn on the gate connected thereto. For example, assume that $OC_2$ is the maximum, then gate 70 will receive a high signal at one of its inputs and cause gate 66 to turn on. Since gate 72 receives no high signal, gate 68 is off. Operational amplifier 62a compares $OC_1$ with $OC_3$. If $OC_1$ is greater than $OC_3$, a positive output passes through gate 66 to the inputs of amplifiers 64a and 64b. On the other hand, if $OC_3$ is greater than $OC_1$, then a negative output is applied gate switch 66 to the inputs of amplifiers 64a and 64b. If the input to amplifier 64a is positive, the output thereof will be high, indicating that $OC_1$ is the next maximum signal. On the other hand, if the input to amplifier 64b is negative, the output thereof will be high, indicating that the next maximum signal is $OC_3$. The operation of amplifiers 64c and 64d is identical.

The outputs of amplifiers 60a, 60b, 60c, 60d are fed to a four-input OR gate 74. The outputs of operational amplifiers 64a, 64b, 64c and 64d are connected to inputs of a four-input OR gate 76. The outputs of OR gates 74 and 76 are connected to the inputs of an AND gate 78. The output of AND gate 78 is the acceptance signal. This signal will only be present when it has been determined that a maximum signal and a next maximum signal are present and that these signals are on adjacent antennas. If this condition does not exist, no acceptance signal is generated at the output of gate 78. The output of gate 78 is fed to circuit $D_2$ which comprises the monopulse ratio generating a circuit and a backlobe response inhibition circuit.

Figure 5:
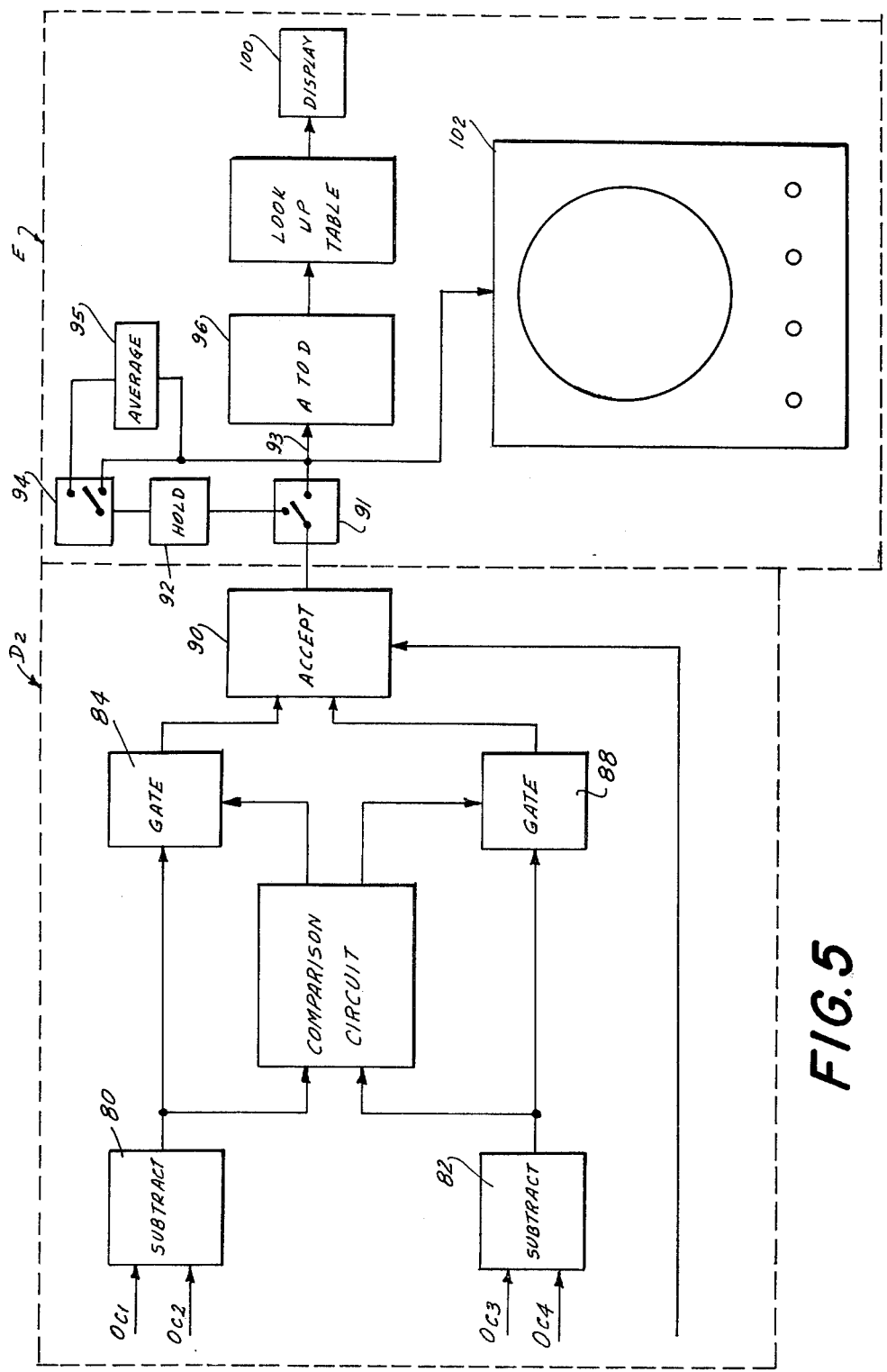
FIG. 5 is a block diagram of the monopulse ratio forming and backlobe inhibiting circuit and the angle calculation and display circuits of the present invention.

As illustrated in FIG. 5, the logarithmic video outputs of receiver channels $C_1$ and $C_2$ are fed to a subtraction circuit 80. Likewise, the logarithmic video outputs from channels $C_3$ and $C_4$ are connected to the inputs of a subtraction circuit 82. Each of the subtraction circuits 80 and 82 forms the monopulse ratio of the outputs of the channels connected thereto. Thus, subtraction circuit 80 will form the ratio of channels $C_1$ and $C_2$. Likewise, subtraction circuit 82 will form the ratio of the channels $C_3$ and $C_4$. In this manner, the monopulse ratio from each pair of receiver channels if formed simultaneously.

The output of subtraction circuit 80 is fed to a gate 84 and to one of the inputs of a comparison circuit 86. The output of subtraction circuit 82 is fed to the input of a gate 88 and the other input of comparison circuit 86. Comparison circuit 86 compares the magnitudes of the simultaneous monopulse ratios. If the signal from subtraction circuit 80 is greater than the signal from subtraction circuit 82, comparison circuit 86 will open gate 84 and close gate 88. On the other hand, if the signal output from subtraction circuit 82 is greater than the signal output from subtraction circuit 80, comparison circuit 86 will open gate 84 and close gate 88.

The outputs of gates 84 and 88 are connected to an acceptance circuit 90, which is connected to receive the acceptance signal from gate 78. In the presence of the acceptance signal, indicating that the maximum and next maximum signals were received on adjacent antennas, acceptance circuit 90 will connect the output of the gate 84 or 88, which has been opened by comparison circuit 86, to the output of the circuit. In this manner, the forelobe response is selected and the backlobe response rejected.

The output of acceptance circuit 90 is the selected monopulse ratio which contains the necessary DF information. This information is processed in a conventional manner. Processing of the ratios may take place as each step is completed or after an entire scan is completed. In the former case, switch 91 connects the output of acceptance circuit 90 to node 93. In the latter case, switch 91 is actuated such that the output of acceptance circuit 90 is connected to hold or memory circuit 92 which has the capacity to retain the output signals from circuit 90 for a given time after which same are connected, through switch 94 to node 93. In the averaging mode, switches 91 and 94 are set such that the ratios from each two successive steps are held in hold circuit 92, then averaged in averaging circuit 95. The output of circuit 95 is then connected to node 93. Node 93 is connected to the numerical value circuit and graphical display circuit.

If a numerical angle of arrival determination is required, the output of acceptance circuit 90 is supplied to the input of a conventional analog-to-digital converter 96 which, in turn, is connected to a conventional lookup table circuit 98 which compares the digital output from circuit 96 to stored values and generates a numerical determination of the angle of arrival at numerical display 100.

On the other hand, if a graphical representation of the angle of arrival is required, the output of acceptance circuit 90 may be fed to the input of a conventional oscilloscope type display 102. In some instances, both numerical and graphical representations are required and, for this reason, FIG. 5 illustrates circuit E as having both numerical and graphical determination equipment. However, it should be noted that either or both types of equipment may be utilized, depending upon which type of information is desired.

It should now be appreciated that the present invention permits omnidirectional coverage with increased accuracy of DF measurement by scanning a larger number of narrower beamwidth antennas and, thus, allowing greater articulation (that is, more dB of change per degree of azimuth coverage), without sacrificing system sensitivity loss, as would be the case if fewer antennas of wider beamwidth were utilized. In addition, the number of receiver channels necessary in processing the multiplicity of antennas is reduced substantially, thus effecting a substantial cost savings. Moreover, instantaneous coverage of part of the 360° sector, by not completing the scan sequence, permits DF angular discrimination in highly populated (dense) environments.

Further, the invention provides a means to utilize monopulse techniques to normalize, that is, remove the effects of pulse-to-pulse variation of the received signals, permitting time to be exchanged for system complexity since effectively, signals appear as constant illuminators permitting the scan to take place, which could not be accommodated if both signal variation and receiver/antenna variation were present. Moreover, the necessity for a two channel rotary joint, which would be required if a monopulse pair were to be rotated by the scan set up by mechanical means, is eliminated. Still further, wide-band, multi-octave antennas may be utilized, thus covering a wide frequency range. This feature is not available when mechanical systems are utilized, since rotary joints and other connections may be limited to octave band coverage.

While only a single embodiment of the present invention, utilizable in three different modes of operation, has been disclosed herein for purposes of illustration, it is obvious that many variations and modifications could be made thereto. It is intended to cover all of these variations and modifications which fall within the scope of the present invention, as defined by the following claims.

I claim:

1. A method for obtaining direction finding information in a monopulse DF radar system of the type having a multi-channel receiver, and an antenna array including a plurality of fixed narrow beamwidth antennas geographically oriented to provide omnidirectional coverage, the method comprising the steps of:
   A. selecting a set of antennas, said selected set comprising first and second oppositely oriented pairs of adjacent antennas;
   B. operatively connecting each of the antennas in said selected set to a different one of the receiver channels, respectively;
   C. simultaneously generating first and second monopulse ratios from the respective signals received on the first and second pairs of adjacent antennas in the selected set;
   D. selecting the ratio which represents the forelobe response of the antennas in the selected set; and
   E. processing the selected ratio to obtain the angle of arrival information.

2. The method of claim 1, further comprising the step of selecting successive sets of antennas in sequence, each of said sets comprising first and second oppositely oriented pairs of adjacent antennas.

3. The method of claim 2, wherein the step of selecting successive sets of antennas comprises the step of: selecting each successive set of oppositely oriented adjacent antenna pairs to include one antenna in each of the adjacent pairs which was selected as a part of the previously selected set.

4. The method of claim 2, wherein X antennas are present in the antenna array and wherein the steps of selecting a set of antennas and selecting successive sets of antennas comprises the steps of:
  (a) selecting a first set comprising a first antenna pair, the first antenna pair comprising first and second adjacent antennas and a second antenna pair, the second antenna pair comprising the adjacent antenna pair oriented oppositely to the first pair of the first set;
  (b) selecting a second set comprising a first antenna pair, the first antenna pair comprising second and third adjacent antennas, and a second antenna pair, the second antenna pair comprising the adjacent antenna pair oriented oppositely to the first pair of the second set;
  (c) selecting a third set comprising a first antenna pair, the first antenna pair comprising third and fourth adjacent antennas, and a second antenna pair, the second antenna pair comprising the adjacent antenna pair oriented oppositely to the first antenna pair of the third set; and
  (d) selecting a fourth set comprising a first antenna pair, the first antenna pair comprising fourth and fifth adjacent antennas, and a second antenna pair, the second antenna pair comprising the adjacent antenna pair oriented oppositely to the first pair of the fourth set.

5. The method of claim 4, wherein $X=8$.

6. The method of claim 2, wherein X antennas are present in the antenna array and wherein the steps of selecting a set of antennas and selecting successive sets of antennas comprise the steps of:
  (a) selecting odd numbered sets of first and second oppositely oriented adjacent antenna pairs to include one antenna in each of the adjacent pairs which was selected as a part of the previously selected odd numbered set; and
  (b) selecting even numbered sets of first and second oppositely oriented antenna pairs to include the same antennas as those selected for the previously selected odd numbered set, but in reverse order.

7. The method of claim 6, wherein the step of selecting odd numbered sets comprises the steps of:
  (a) selecting a first set comprising a first antenna pair, the first antenna pair comprising first and second adjacent antennas, and a second antenna pair, the second antenna pair comprising the adjacent antenna pair oriented oppositely to the first pair of the first set;
  (b) selecting a third set comprising a first antenna pair, the first antenna pair comprising second and third adjacent antennas and a second antenna pair, the second antenna pair comprising the adjacent antenna pair oriented oppositely to the first pair of the third set;
  (c) selecting a fifth set comprising a first antenna pair, the first antenna pair comprising third and fourth adjacent antennas, and a second antenna pair, the second antenna pair comprising the adjacent antenna pair oriented oppositely to the first pair of the fifth set; and
  (d) selecting a seventh set comprising a first antenna pair, the first antenna pair comprising fourth and fifth adjacent antennas, and a second antenna pair, the second antenna pair comprising the adjacent antenna pair oriented oppositely to the first pair of the seventh set.

8. The method of claim 6, wherein the step of selecting even numbered sets comprises the steps of:
  (a) selecting a second set comprising a first antenna pair, the first antenna pair comprising second and first adjacent antennas, and a second antenna pair, the second antenna pair comprising the antenna pair oppositely oriented to the first pair of the second set;
  (b) selecting a fourth set comprising a first antenna pair, the first antenna pair comprising third and second adjacent antennas, and a second antenna pair, the second antenna pair comprising the antenna pair oppositely oriented to the first pair of the fourth set;
  (c) selecting a sixth set comprising a first antenna pair, the first antenna pair comprising fourth and third adjacent antennas, and a second antenna pair, the second antenna pair comprising the antenna pair oppositely oriented to the first pair of the sixth set; and
  (d) selecting an eighth set comprising a first antenna pair, the first antenna pair comprising fifth and fourth adjacent antennas, and a second antenna pair, the second antenna pair comprising the antenna pair oppositely oriented to the first pair of the eighth set.

9. The method of claim 7, wherein the step of selecting even numbered sets comprises the steps of:
  (a) selecting a second set comprising a first antenna pair, the first antenna pair comprising second and first adjacent antennas, and a second antenna pair, the second antenna pair comprising the adjacent antenna pair oriented oppositely to the first pair of the second set;
  (b) selecting a fourth set comprising a first antenna pair, the first antenna pair comprising third and second adjacent antennas, and a second antenna pair, the second antenna pair comprising the antenna pair oppositely oriented to the first pair of the fourth set;
  (c) selecting a sixth set comprising a first antenna pair, the first antenna pair comprising fourth and third adjacent antennas, and a second antenna pair, the second antenna pair comprising the antenna pair oppositely oriented to the first pair of the sixth set; and
  (d) selecting an eighth set comprising a first antenna pair, the first antenna pair comprising fifth and fourth adjacent antennas, and a second antenna pair, the second antenna pair comprising the antenna pair oppositely oriented to the first pair of the eighth set.

10. The method of claim 9, wherein $X=8$.

11. The method of claim 2, wherein X antennas are present in the array and wherein the step of selecting successive sets of antennas comprises the step of: selecting each set of oppositely oriented adjacent antennas to include only antennas which were not selected in the previous set.

12. The method of claim 11, wherein the step of selecting each set comprises the steps of:
  (a) selecting a first set comprising a first antenna pair, the first antenna pair comprising first and second adjacent antennas, and a second antenna pair, the second antenna pair comprising the adjacent antenna pair oppositely oriented to the first pair of the first set;
  (b) selecting a second set comprising a first antenna pair, the first antenna pair comprising third and fourth adjacent antennas, and a second antenna pair, the second antenna pair comprising the adjacent antenna pair oppositely oriented to the first pair of the second set;

(c) selecting a third set comprising a first antenna pair, the first antenna pair comprising second and third adjacent antennas, and a second antenna pair, the second antenna pair comprising the adjacent antenna pair oppositely oriented to the first pair of the third set; and (d) selecting a fourth set comprising a first antenna pair, the first antenna pair comprising fourth and fifth adjacent antennas, and a second antenna pair, the second antenna pair comprising the adjacent antenna pair oppositely oriented to the first pair in the fourth set.

13. The method of claim 12, wherein X=8.

14. The method of claim 1, wherein the receiver comprises two pairs of matched channels and wherein the step of operably connecting comprises:

(a) connecting the antennas in the first antenna pair to the channels in the first channel pair, respectively; and (b) connecting the antennas in the second antenna pair to the channels in the second channel pair, respectively.

15. The method of claim 14, wherein the step of connecting the first antenna pair comprises connecting the first antenna in the first antenna pair to the first channel in the first channel pair, and the second antenna in the first antenna pair to the second channel in the first channel pair.

16. The method of claim 14, wherein the step of connecting the second antenna pair comprises connecting the first antenna in the second antenna pair to the first channel in the second channel pair and the second antenna in the second antenna pair to the second channel in the second channel pair.

17. The method of claim 15, wherein the step of connecting the second antenna pair comprises connecting the first antenna in the second antenna pair to the first channel in the second channel pair and the second antenna in the second antenna pair to the second channel in the second channel pair.

18. The method of claim 1, wherein the step of determining the monopulse ratio comprises the steps of:

(a) detecting the received signal at each selected antenna, respectively;

(b) logarithmically amplifying each detected signal;

(c) subtracting the logarithmically amplified outputs generated in accordance with the signals received in the antenna in the first antenna pair to form a first monopulse ratio; and (d) subtracting the logarithmically amplified outputs generated in accordance with the signals received on the antennas in the second antenna pair to form a second monopulse ratio.

19. The method of claim 1, wherein the step of selecting the forelobe response comprises the steps of: comparing the magnitudes of the first and second ratios; and selecting the ratio with the greater magnitude.

20. The method of claim 1, further comprising the step of accepting each of the selected ratios comprising the steps of:

(a) determining whether a signal of maximum magnitude is present on the output of a channel;

(b) determining whether a signal of next maximum magnitude is present on the output of a channel; and (c) accepting the selected ratio for processing if the channel receiving the next maximum signal is adjacent to the channel receiving the maximum signal.

21. Apparatus for obtaining direction finding information in a monopulse DF radar system of the type having a multi-channel receiver and an antenna array including a plurality of fixed narrow beamwidth antennas geographically oriented to provide omnidirectional coverage, the apparatus comprising means for selecting a set of antennas comprising first and second oppositely oriented pairs of antennas, said selecting means comprising means for respectively operatively connecting said selected antennas to different receiver channels and means for controlling said connecting means to select said antennas; means for simultaneously generating first and second monopulse ratios from the respective signals received on the antennas in each selected set; means for selecting the forelobe response of the selected antennas and means for processing the ratio representing said selected forelobe response to obtain angle of arrival information.

22. The apparatus of claim 21, wherein said control means comprises means for causing said connecting means to select successive sets of antennas in sequence.

23. The apparatus of claim 21, wherein said connecting means comprises first and second tiers of interconnected switches, the inputs of the switches of said first tier being operably connected to receive the R.F. output of each of the antennas, respectively, and the outputs of the switches in said second tier being connected to the inputs of the receiver channels, respectively.

24. The apparatus of claim 23, wherein said connecting means comprises a third tier of switches interposed between the outputs of the switches in said second tier and the receiver channels.

25. The apparatus of claim 23, wherein each of said switches is electronically controllable.

26. The apparatus of claim 25, wherein the state of each of said switches is controlled by said control means.

27. The apparatus of claim 21, wherein said control means comprises a timing signal generator and a shift register operably connected to be indexed by said generator.

28. The apparatus of claim 27, wherein the antennas are connected by said connecting means in accordance with the state of said register.

29. The apparatus of claim 27, further comprising a bistable circuit operatively interposed between said register and generator such that said register is indexed at one-half the rate of the signals generated by said generator.

30. The apparatus of claim 27, further comprising means for interchanging the output signals on two of the outputs of said shift register.

31. The apparatus of claim 21, wherein said ratio generating means comprises first and second matched receiver pairs operably connected to receive outputs from said selected antennas, respectively, and to generate logarithmic video output signals in accordance therewith; subtraction means respectively operably connected to receive said logarithmic video signals and to generate first and second monopulse ratios therefrom.

32. The apparatus of claim 21, wherein said forelobe selecting means comprises means for comparing said first and second ratios and means for selecting the greater of the compared ratios.

33. The apparatus of claim 21, wherein said apparatus further comprises means for determining if a maximum and next maximum signal are received on adjacent antennas.

34. The apparatus of claim 33, wherein said apparatus further comprises means for accepting the selected ratios if said maximum and next maximum signals are received on adjacent antennas.

* * * * *